United States Patent [19]
Akita

[11] Patent Number: 5,984,261
[45] Date of Patent: Nov. 16, 1999

[54] FLOW CONTROL VALVE UNIT INCLUDING ELECTRIC COIL ACTUATED ROD

[75] Inventor: Tokihiko Akita, Nagoya, Japan

[73] Assignee: Aisin Seiki Kabushiki Kaisha, Kariya, Japan

[21] Appl. No.: 08/975,357

[22] Filed: Nov. 20, 1997

[51] Int. Cl.[6] .................................................. F16K 47/00
[52] U.S. Cl. .................... 251/127; 251/129.15; 251/118; 303/119.2
[58] Field of Search .......................... 251/129.15, 129.08, 251/127, 118; 303/119.1, 119.02

[56] References Cited

U.S. PATENT DOCUMENTS

| | | | |
|---|---|---|---|
| 3,640,098 | 2/1972 | Eastall | 68/12.06 |
| 4,923,169 | 5/1990 | Grieb et al. | 251/127 |
| 4,925,156 | 5/1990 | Stoll et al. | 251/129.01 |
| 5,102,095 | 4/1992 | Schmitt-Matzen et al. | 251/127 |
| 5,192,048 | 3/1993 | Wakeman | 251/129.15 |
| 5,236,173 | 8/1993 | Wakeman | 251/118 |
| 5,318,066 | 6/1994 | Burgdorf et al. | 303/119.2 |
| 5,443,309 | 8/1995 | Beck | 303/119.2 |
| 5,474,106 | 12/1995 | Burgdorf et al. | 303/119.2 |
| 5,503,184 | 4/1996 | Reinartz et al. | 251/129.08 |
| 5,647,644 | 7/1997 | Volz et al. | 303/119.2 |

FOREIGN PATENT DOCUMENTS 3-223578  10/1991  Japan .
6-241342  8/1994  Japan .

*Primary Examiner*—Denise L. Ferensic
*Assistant Examiner*—John Ball
*Attorney, Agent, or Firm*—Burns, Doane, Swecker & Mathis, L.L.P.

[57] ABSTRACT

A flow control valve unit includes a pressurized fluid inlet, a pressurized fluid outlet, a pressurized fluid chamber in which is positioned a stationary seat member, a partition member dividing the pressurized fluid chamber into a first section in constant communication with the inlet and a second section that communicates with the outlet via a center opening in the stationary seat member, an orifice for communicating said first and second sections to each other, and a through hole formed in the partition member. A movable rod is positioned within the pressurized fluid chamber and extends through the through hole in the partition member. The movable rod has a sealing portion at one end for opening and closing the center opening in the stationary seat member during movement of the stationary member. A spring is operatively associated with the movable rod for urging the movable rod in a direction which causes the sealing portion to close the center opening. A movable magnetic body is disposed in the first section and is operatively connected to the movable rod, and an electric coil is provided for generating a magnetic force that urges the movable rod via the movable magnetic body in a direction to cause the sealing member to move away from and open the center opening.

19 Claims, 7 Drawing Sheets

FLOW CONTROL VALVE UNIT INCLUDING ELECTRIC COIL ACTUATED ROD

FIELD OF THE INVENTION

The present invention generally relates to a valve unit. More specifically, the present invention concerns a flow control valve unit, useful in connection with, for example, a vehicle braking system.

BACKGROUND OF THE INVENTION

Japanese Patent Application Laid-Open No. Hei 6-241342 discloses an electromagnetic switching valve unit that is employed in an anti-lock brake system, a brake traction control system or the like of an automotive vehicle to automatically control brake fluid pressure applied to the wheels of the vehicle. The disclosed electromagnetic switching valve unit is relatively compact and inexpensive, and capable of decreasing the rate of change of brake fluid pressure to a certain extent by starting and stopping energization of an electric coil in a time dependent manner. This valve is opened or closed at a relatively high speed when energization of the electric coil is started or stopped. Therefore, when the valve is closed, there is a possibility of noise being generated by the brake fluid flowing through the valve or a sealing portion and a seat member of the valve that collide with each other. Because this type of conventional electromagnetic switching valve unit is unable to change the brake fluid pressure at a sufficiently low speed, it cannot be employed in a control system that requires brake fluid pressure to be changed quite gently, for example a system for controlling the distance between a travelling vehicle equipped with the system and a preceding travelling vehicle.

A flow control valve unit such as that disclosed in Japanese Patent Application Laid-Open No. Hei 3-223578 can be employed in a system that requires brake pressure to be changed quite gently. However, this flow control valve unit possesses certain drawbacks in that it is bulky and expensive, and requires energization of an electric coil to be controlled in an analogue manner with the aid of PWM (pulse width modulation) or the like.

SUMMARY OF THE INVENTION

A need thus exists for a flow control valve unit that is compact, inexpensive, and not susceptible of the same disadvantages and drawbacks as other known types of flow control valve units.

According to the present invention, a flow control valve unit includes a pressurized fluid inlet, a pressurized fluid outlet, a pressurized fluid chamber in which is positioned a stationary seat member, a partition member dividing the pressurized fluid chamber into a first section in constant communication with the inlet and a second section that communicates with the outlet via a center opening in the stationary seat member, an orifice for communicating said first and second sections to each other, and a through hole formed in the partition member. A movable rod is positioned within the pressurized fluid chamber and extends through the through hole in the partition member. The movable rod has a sealing portion at one end for opening and closing the center opening in the stationary seat member during movement of the stationary member. A spring is operatively associated with the movable rod for urging the movable rod in a direction which causes the sealing portion to close the center opening. A movable magnetic body is disposed in the first section and is operatively connected to the movable rod, and an electric coil is provided for generating a magnetic force that urges the movable rod via the movable magnetic body in a direction to cause the sealing member to move away from and open the center opening.

When the electric coil is not energized, the spring causes the movable rod to move in a direction which effects closing of the center opening. The sealing portion of the movable rod then contacts the seat member, thereby closing the center opening. When the center opening is completely closed, the pressure applied to the second section is equal to that applied to the first section. In this state, a differential pressure between the inlet and the outlet is applied to a circular area having an effective sealing diameter defined by the sealing portion and the seat member so that the movable rod is urged in a closing direction for closing the center opening.

When the electric coil is energized, a magnetic force is generated that corresponds to the current flowing through the electric coil, and the magnetic force urges the movable rod in the opening direction for opening the center opening. If the current flowing through the electric coil is large enough to generate a magnetic force that is greater than the force urging the movable rod in the closing direction (the sum of a force generated by the spring and the force generated by the pressure differential between the inlet and the outlet that is applied to the aforementioned circular area having the effective sealing diameter), the movable rod moves in the opening direction so that the sealing portion moves away from the stationary seat member. Then, the pressurized fluid that has entered the first section through the inlet flows through the orifice, the second section, a gap formed between the sealing portion and the stationary seat member and the center opening formed in the stationary seat member into the outlet. Since the orifice restricts the flow of pressurized fluid, the fluid pressure in the second section becomes lower than fluid pressure in the first section. In this state, the differential pressure between the first and second sections is applied to the cross-sectional area of a portion of the movable rod penetrating the through hole formed in the partition member so that the movable rod is urged in the closing direction. Until the sum of this urging force and the force generated by the spring becomes equal to the aforementioned suction force, the movable rod continues to move in such a direction as to open the center opening. The amount of pressurized fluid flowing through the outlet is determined by the pressure differential between the first and second sections and the area of the orifice, and the pressure differential between the first and second sections is determined by the magnetic force generated by the electric coil. Accordingly, the amount of pressurized fluid flowing through the outlet can be adjusted by controlling the current flowing through the electric coil.

The flow control valve unit of the present invention can be employed in a brake fluid pressure control apparatus in order to selectively open a brake fluid pressure supply passage extending from a high pressure source to a wheel brake, or in a brake fluid pressure release passage extending from a wheel brake to a low pressure source. In this case, the flow control valve unit has a pressurized brake fluid inlet, a brake fluid outlet, and an electric coil. The brake fluid flows through the outlet in accordance with the current flowing through the electric coil. The flow control valve unit further includes a flywheel diode disposed in parallel with the electric coil and a switching element for starting and stopping energization of the electric coil in a time-dependent manner.

By virtue of this construction, when the switching element starts or stops energization of the electric coil, the current flowing through the electric coil changes gently due to inductance. As a result, the movable rod moves gently and the amount of brake fluid flowing through the outlet changes gently as well.

According to another aspect of the invention, a flow control valve unit includes a body in which is defined a pressurized fluid chamber, a pressurized fluid inlet formed in the body, a pressurized fluid outlet formed in the body, a seat member in the body that is provided with a through opening, and a partition member dividing the pressurized fluid chamber into a first section in communication with the pressurized fluid inlet and a second section in communication with the outlet via the through opening in the seat member. An orifice is provided in the partition member for communicating the first and second sections to each other. A movable rod is positioned within the body and is provided with a sealing portion at one end. The movable rod is movable in a closing direction in which the rod moves towards the seat member to cause the sealing portion to engage the seat member and close the through opening and is movable in an opening direction in which the rod moves away from the seat member to cause the sealing portion to move out of engagement with the seat member and open the through opening. A movable magnetic body is operatively connected to the movable rod, and an electric coil is provided for generating a magnetic force that urges the movable rod via the movable magnetic body in the opening direction.

In accordance with another aspect of the invention, a flow control valve unit includes a body in which is defined a pressurized fluid chamber, a pressurized fluid inlet formed in the body, a pressurized fluid outlet formed in the body, and a seat member located in the body and including a through opening communicating the pressurized fluid chamber with the pressurized fluid outlet. A movable rod is positioned within the body and has a sealing portion at one end. The movable rod is movable in a closing direction in which the rod moves towards the seat member to cause the sealing portion to engage the seat member and close the through opening and is movable in an opening direction in which the rod moves away from the seat member to cause the sealing portion to move out of engagement with the seat member and open the through opening. An orifice is located in the pressurized fluid chamber at a position between the seat member and the pressurized fluid inlet for restricting fluid flow from the pressurized fluid inlet towards the through hole in the seat member. A movable magnetic body is operatively connected to the movable rod and an electric coil generates a magnetic force that urges the movable rod via the movable magnetic body in the opening direction.

BRIEF DESCRIPTION OF THE DRAWING FIGURES

The foregoing and additional details and features associated with the present invention will become apparent from the following detailed description considered with reference to the accompanying drawing figures in which like reference numerals designate like elements and wherein.

DETAILED DESCRIPTION OF THE INVENTION

Figure 1:
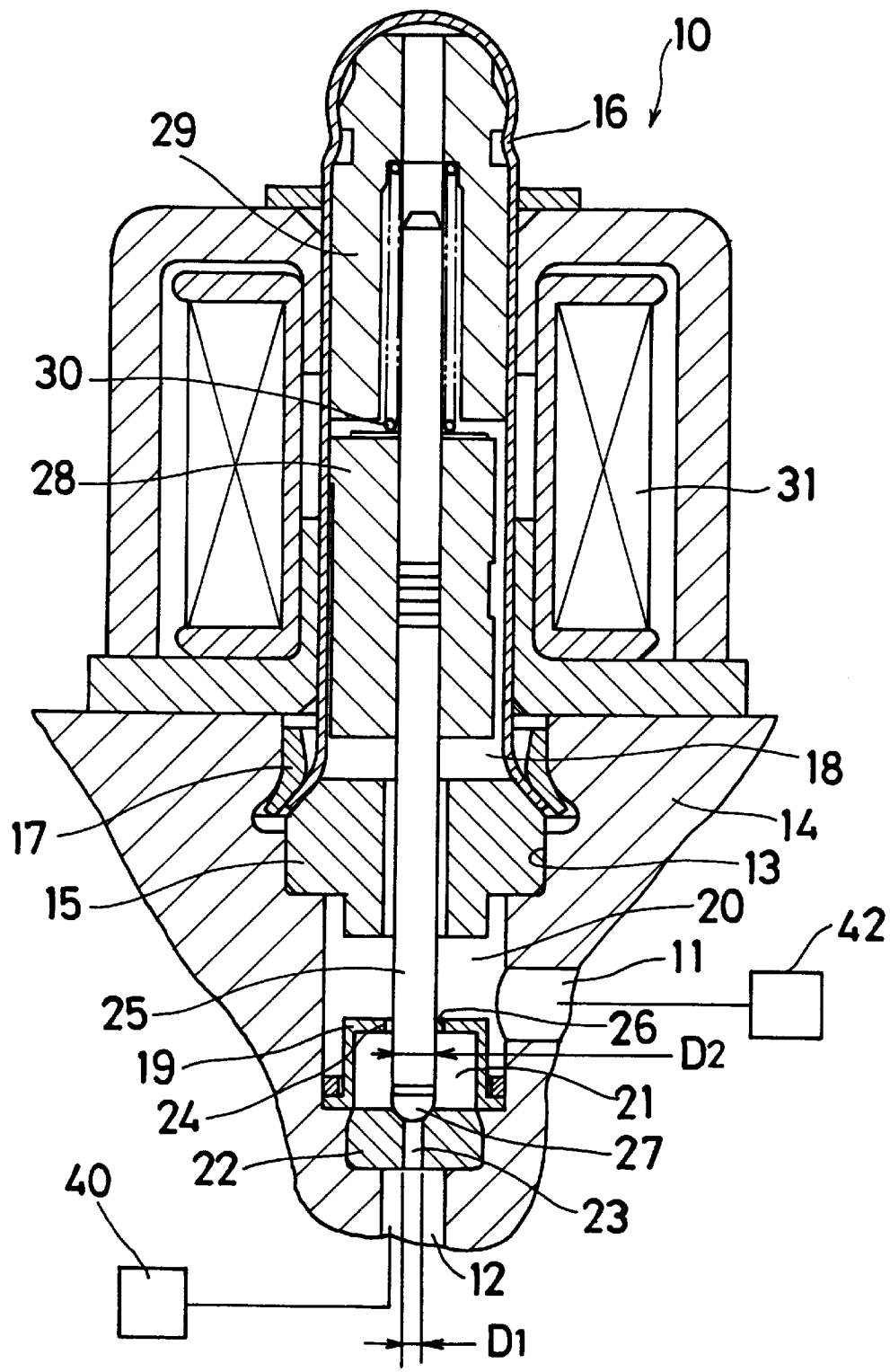
FIG. 1 is a longitudinal cross-sectional view of a flow control valve unit according to a first embodiment of the present invention.

With reference initially to the longitudinal cross-sectional view of the flow control valve unit 10 according to a first embodiment of the present invention shown in FIG. 1, the flow control valve unit 10 includes a housing or body 14 that is provided with a pressurized fluid inlet 11 for introducing pressurized fluid, a pressurized fluid outlet 12 for discharging pressurized fluid, and a stepped hole or bore 13 extending longitudinally within the body 14. A member 15 and a sleeve 16 are positioned within the stepped bore 13 and are fluid-tightly fitted to the body 14 through a spacer 17. The spacer 17 is press-fitted between an undercut portion of the stepped bore 13 and a shoulder portion of the sleeve 16. A stationary seat member 22 is fixed to the body 14 adjacent the outlet 12. A pressurized fluid chamber 18 is thus defined within the stepped bore 13 between sleeve 16 and the stationary seat member 22 at the lower region of the stepped bore 13.

In the case where the flow control valve unit 10 is used to selectively open a brake fluid pressure supply passage that extends from a high pressure source such as a high pressure accumulator to a wheel brake, the inlet 11 is connected to the high pressure source (e.g., the accumulator) and the outlet 12 is connected to the wheel brake. FIG. 1 schematically illustrates the flow control unit valve 10 in a brake fluid pressure supply passage, with the schematically illustrated element identified with reference numeral 40 in FIG. 1 representing the wheel brake while the schematically illustrated element identified with reference numeral 42 in FIG. 1 representing the high pressure source (e.g. accumulator).

In the case where the flow control valve unit 10 is used to selectively open a brake fluid pressure release passage that extends from a wheel brake to a low pressure source such as a reservoir, the inlet 11 is connected to the wheel brake and the outlet 12 is connected to the reservoir. FIG. 1 schematically illustrates the flow control unit valve 10 in a brake fluid pressure release passage, with the schematically illustrated element identified with reference numeral 40 in FIG. 1 representing the reservoir while the schematically illustrated element identified with reference numeral 42 in FIG. 1 representing the wheel brake.

Secured within the lower end portion of the pressurized fluid chamber 18 is a partition member 19 that divides the pressurized fluid chamber 18 into a first upper section 20 and a second lower section 21. The first section 20 is constantly in communication with the inlet 11 and the second section 21 is in communication with the outlet 12 through a center opening 23 provided in the stationary seat member 22. The partition member 19 has a through hole 24 that is concentric with the center opening 23 in the stationary seat member 22. A movable rod 25 extends through the through hole 24 in the partition member 19. An orifice 26 is thus formed between the outer periphery of the movable rod 25 and the inner periphery of the through hole 24.

The lower end of the movable rod 25 is provided with a sealing portion 27 that moves towards and into engagement with the stationary seat member 22, and away from and out of engagement with the stationary seat member 22. The end of the rod 25 adjacent the sealing portion 27 possesses a constant outer diameter. A gap between the sealing portion 27 and the stationary seat member 22 that occurs during operation of the unit allows the second section 21 to communicate with the center opening 23 in the stationary seat member 22. The effective sealing diameter D1 defined by the sealing portion 27 and the stationary seat member 22 is smaller than the outer diameter D2 of the movable rod 25.

The movable rod 25 is integrated with a movable magnetic body 28 that is slidably fitted within the sleeve 16. A stationary magnetic body 29 is provided above the movable magnetic body 28. Provided between the movable magnetic body 28 and the stationary magnetic body 29 is a spring 30 that urges the movable rod 25 downwards. The spring 30 engages the upper end of the movable magnetic body 28 and extends upwardly into a recessed area provided in the stationary magnetic body 29. An electric coil 31 is disposed around the outer periphery of the sleeve 16. When the electric coil 31 is energized, a magnetic force corresponding to the current flowing through the electric coil 31 is generated between the movable magnetic body 28 and the stationary magnetic body 29.

In the first embodiment shown in FIG. 1, the area of the orifice 26 does not change even when the movable rod 25 makes a stroke.

The operation of the flow control valve unit of the first embodiment will now be described. When the electric coil 31 is not energized, the sealing portion 27 of the movable rod 25 is in contact with the stationary seat member 22. In this state, the second section 21 is not in communication with the center opening 23 in the stationary seat member 22 and so the pressurized fluid is not able flow from the second section 21 into the center opening 23 of the stationary seat member 22. Since the pressurized fluid is not able to flow from the first section 20 into the second section 21 either, there is no differential pressure generated between the first section 20 and the second section 21. The movable rod 25 is urged downwards by a force F1 generated by the spring 30 and by a force F2 caused by the pressure differential ΔPI between the inlet 11 and the outlet 12 that is applied to the circular area having a diameter equal to the effective sealing diameter D1.

When the electric coil 31 is energized, a magnetic force F3 corresponding to the current flowing through the coil is generated between the movable magnetic body 28 and the stationary magnetic body 29. The magnetic force F3 urges the movable rod 25 upwards. If the magnetic force F3 exceeds the sum of the force F1 and the force F2, the movable rod 25 moves upwards and causes the sealing portion 27 to move away from the stationary seat member 22. The pressurized fluid then flows from the second section 21 into the center opening 23 of the stationary seat member 22. The orifice 26 restricts the flow of pressure fluid flowing from the first section 20 into the second section 21, so that there is a pressure differential ΔP2 generated between the first section 20 and the second section 21. The differential pressure AP2 is applied to the circular area having the diameter D2, thereby generating a downward force F4. In this state, the movable rod 25 is urged downwards by the force F1 and the force F4. If the magnetic force F3 exceeds the sum of the force F1 and the force F4, the movable rod 25 moves upwards, so that the gap between the sealing portion 27 and the seat member 22 increases. Thus, the pressure applied to the second section 21 decreases, the differential pressure between the first and second sections 20, 21 increases, and the force F4 increases. The upward movement of the movable rod 25 continues until the sum of the force F1 and the force F4 becomes equal to the force F3. That is, the movable rod 25 stops as soon as the sum of the force F1 and the force F4 becomes equal to the force F3.

By reducing the current flowing through the electric coil 31, the forces urging the movable rod 25 upwards become smaller than those urging the movable rod 25 downwards. The movable rod 25 then moves downwards, so that the gap between the sealing portion 27 and the stationary seat member 22 decreases. Thus, the pressure applied to the second section 21 increases, the pressure differential between the first and second sections 20, 21 decreases, and the force F4 decreases. The downward movement of the movable rod 25 continues until the sum of the force F1 and the force F4 becomes equal to the force F3. That is, the movable rod 25 stops as soon as the sum of the force F1 and the force F4 becomes equal to the force F3.

Figure 2:
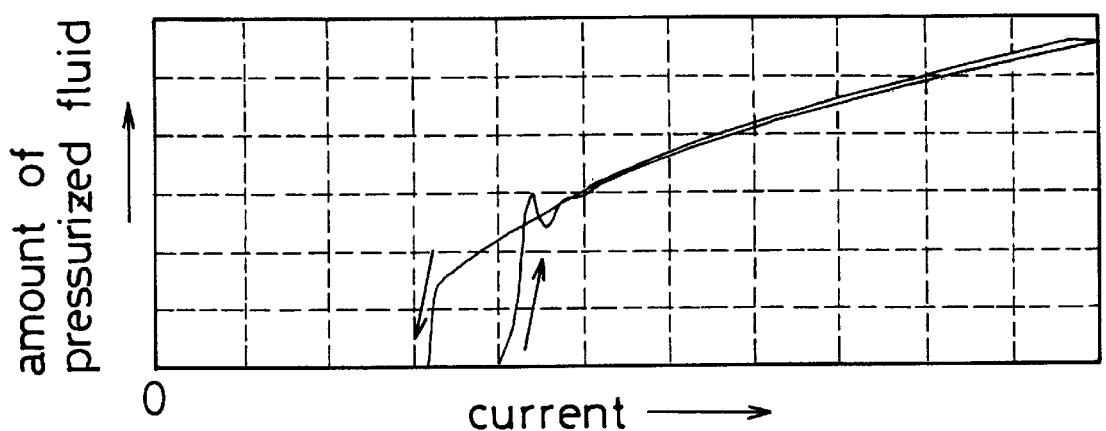
FIG. 2 is a graph illustrating the relationship between the current flowing through the electric coil and the amount of pressurized fluid flowing through the outlet in connection with the embodiment of the flow control valve unit shown in FIG. 1.

FIG. 2 graphically illustrates for the embodiment of the present invention described above and shown in FIG. I the relationship between the current flowing through the electric coil 31 and the amount of pressurized fluid flowing through the outlet 12.

A conventional electromagnetic switching valve unit can be outfitted to produce a flow control valve similar to the present invention by adding the partition member 19 illustrated in FIG. 1. In other words, the advantages associated with the flow control valve unit 10 of the present invention, which is compact and inexpensive, can be achieved by adding the partition member 19 to a conventional electromagnetic switching valve unit.

Figure 3:
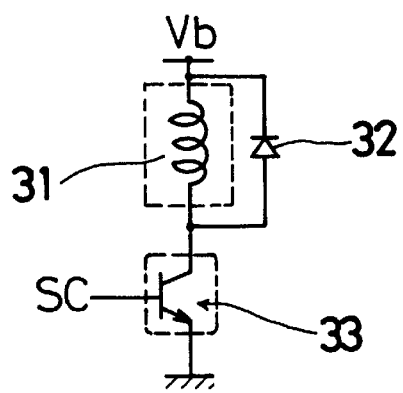
FIG. 3 is an electric circuit for controlling energization of the electric coil in the present invention.

FIG. 3 shows the electric circuit that controls energization of the electric coil 31 of the flow control valve unit 10. As shown in FIG. 3, a flywheel diode 32 is arranged in parallel with the electric coil 31. One end of the electric coil 31 is supplied with a supply voltage Vb, while the other end is grounded via a Power MOS FET 33. The Power MOS FET 33 is a switching element that executes an ON-OFF time-dependent control. That is, it starts and stops energization of the electric coil 31 in a time-dependent manner. The Power MOS FET 32 operates in response to an ON-OFF time-dependent control signal SC.

Figure 4:
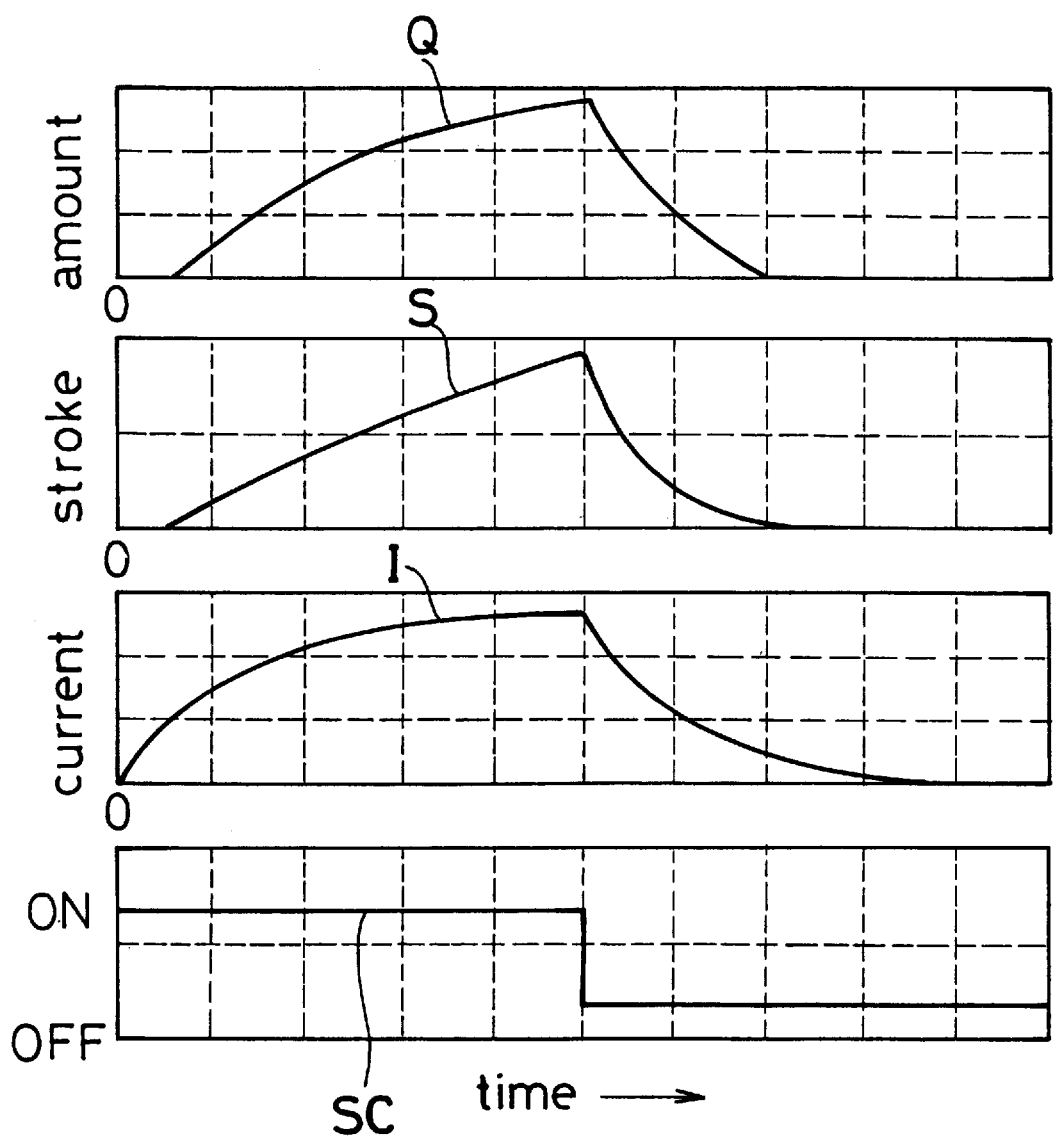
FIG. 4 is a graph illustrating how the current flowing through the electric coil, the stroke amount of the movable rod, and the amount of flow change in accordance with changes in the ON-OFF time-dependent control signal in accordance with the present invention.

FIG. 4 illustrates how the current I flowing through the electric coil 31, the stroke amount S of the movable rod 25, and the amount of pressurized fluid flowing through the outlet 12 change in accordance with changes in the ON-OFF time-dependent control signal SC. It is to be noted that the stroke amount S is zero when the sealing portion 27 is in contact with the stationary seat member 22.

Referring to FIG. 3, when the ON-OFF time-dependent control signal SC reaches the ON-level, the Power MOS FET 33 is activated. The current I flowing through the electric coil 31 then increases with a first order delay due to inductance of the electric coil 31 as shown in FIG. 4. Thus, the stroke amount S of the movable rod 25 and the amount of flow Q increase with a corresponding delay.

When the ON-OFF time-dependent control signal SC reaches the OFF-level, the current I flowing through the electric coil 31 then decreases with a first order delay due to inductance of the electric coil 31 as shown in FIG. 4. Thus, the stroke amount S of the movable rod 25 and the amount of flow Q decrease with a corresponding delay.

Figure 5:
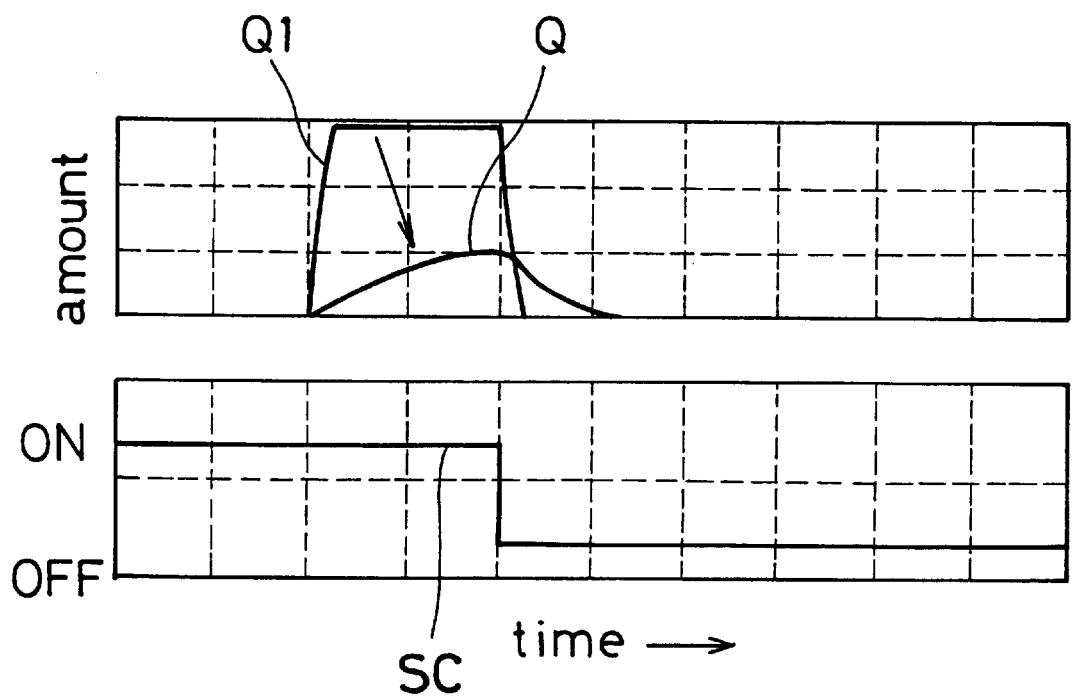
FIG. 5 is a graph illustrating how the amount of flow changes in accordance with changes in the ON-OFF time-dependent control signal SC, and illustrating a comparison between the flow control valve unit of the first embodiment of the present invention and a conventional electromagnetic switching valve unit.

Comparing the flow control valve unit 10 as illustrated in FIGS. 1 and 3 and the conventional electromagnetic switching valve unit that is normally closed, FIG. 5 illustrates how the amount of flow Q changes in accordance with the change of the ON-OFF time-dependent control signal SC. As shown in FIG. 5, in the case of the conventional electromagnetic switching valve unit, the amount of flow Q1 increases abruptly and markedly (i.e., quickly) when the ON-OFF time-dependent control signal SC reaches the ON-level. When the ON-OFF time-dependent control signal SC reaches the OFF-level, the amount of flow Q1 decreases abruptly and markedly.

On the other hand, in the case of the flow control valve unit of the present invention, the amount of flow Q changes slowly and quite gently in accordance with the change in the ON-OFF time-dependent control signal SC. Accordingly, in the case where the flow control valve unit 10 is employed in a brake fluid pressure control apparatus, it is possible to change the brake fluid pressure quite gently. It is thus possible to reduce the noise caused by the brake fluid or the mechanical parts constituting the brake fluid pressure control apparatus.

Figure 6:
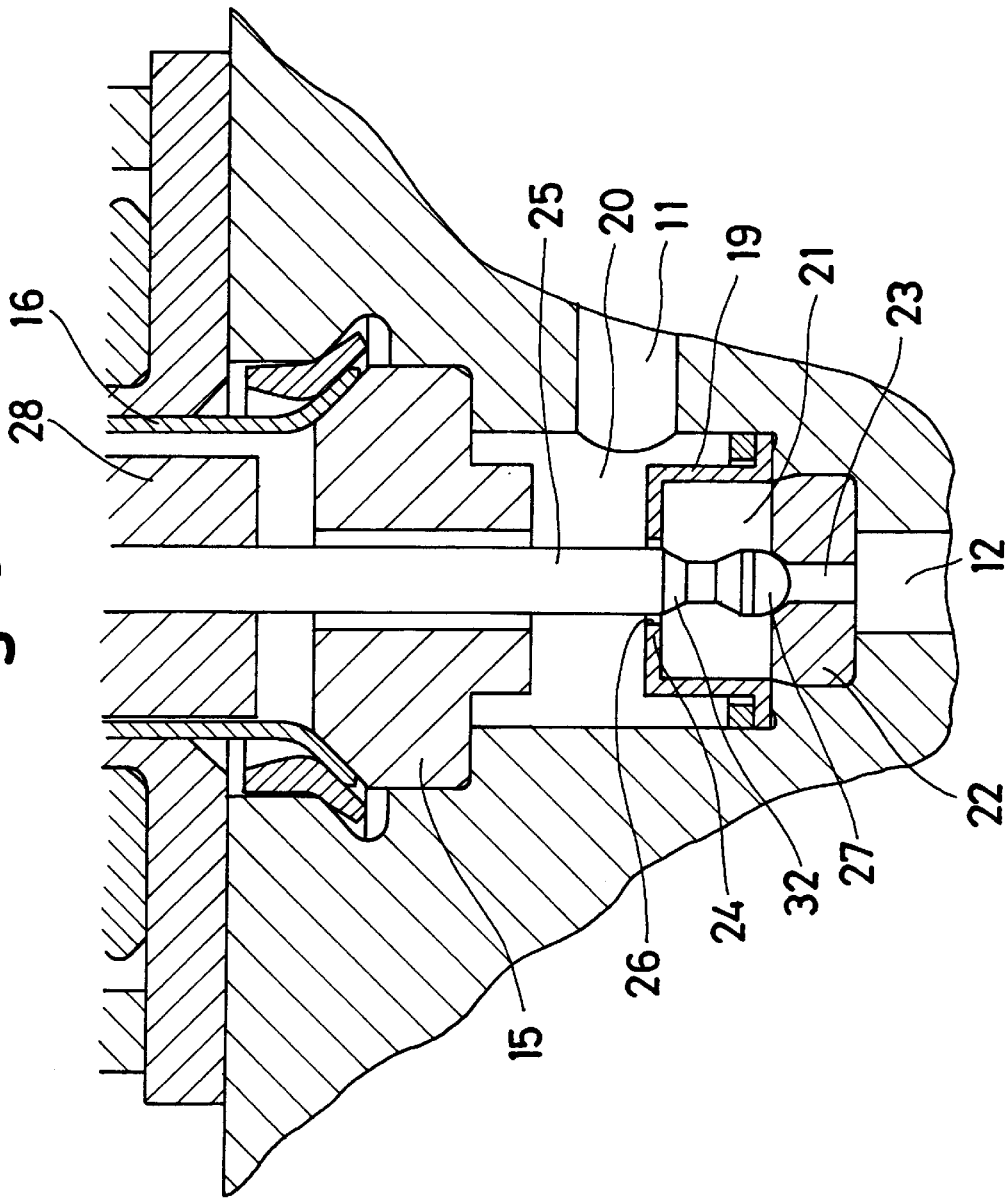
FIG. 6 is a partially enlarged cross-sectional view of a portion of a flow control valve unit according to a second embodiment of the present invention.
Figure 7:
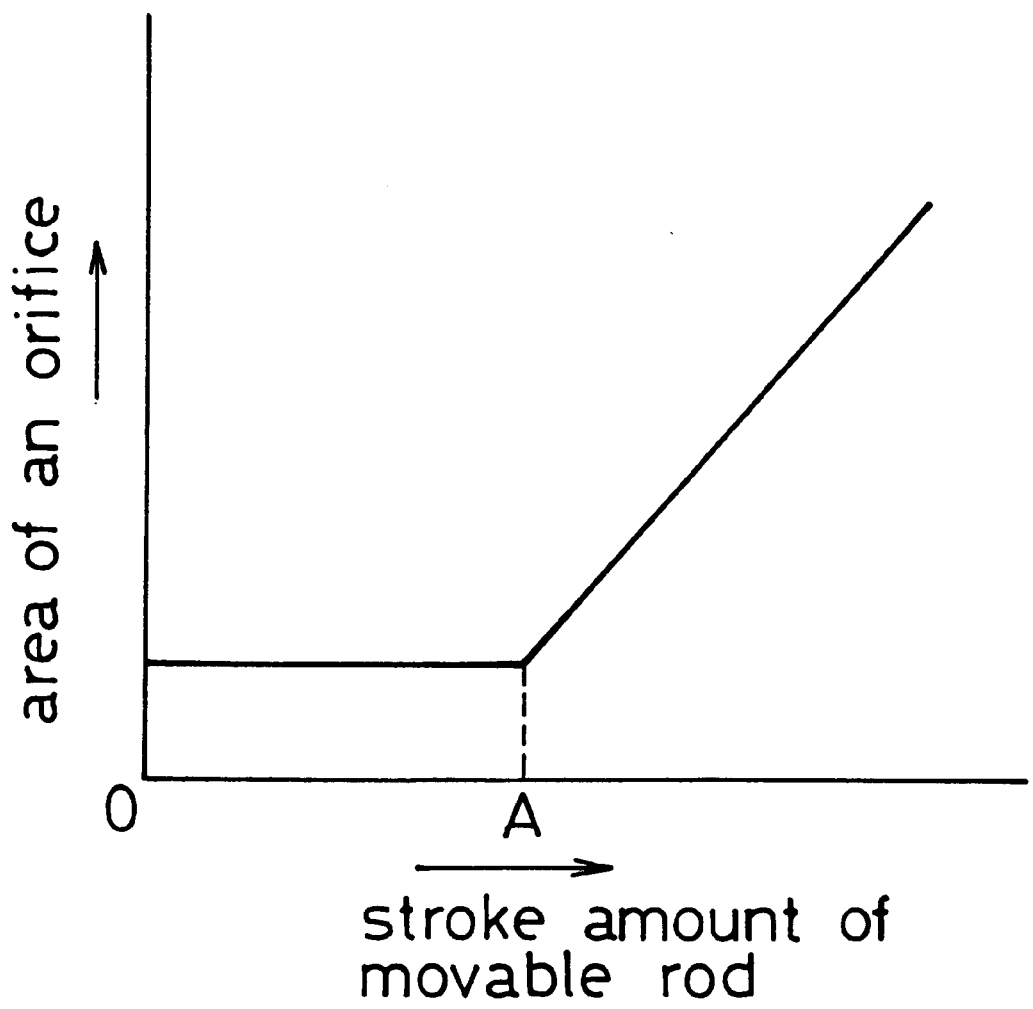
FIG. 7 is a graph illustrating the relationship between the stroke amount of the movable rod and the area of the orifice in accordance with the second embodiment of the present invention shown in FIG. 5.

According to the first embodiment, the area of the orifice 26 of the flow control valve unit 10 does not change (i.e., remains constant) even when the movable rod 25 makes a stroke. The flow control valve unit 10 according to a second embodiment of the present invention is constructed such that the area of the orifice 26 changes in accordance with the stroke amount of the movable rod 25. FIG. 6 is a partially enlarged sectional view of a portion of the flow control valve unit 10 of the second embodiment. As shown in FIG. 6, a tapered recess portion 32 is formed around the outer periphery of the movable rod 25 adjacent the sealing portion 27. When the movable rod 25 is located in the position shown in FIG. 6 in which the sealing portion 27 is in contact with the seat member 22, the tapered recess portion 32 is located within the second section 21 just below the through hole 24 in the partition member 19. As shown in the graph of FIG. 7, in the region where the stroke amount of the movable rod 25 (the distance the sealing portion 27 has covered by moving upwards away from the stationary seat member 22) is greater than a value equal to A, the orifice 26 is defined by the outer periphery of the tapered recess portion 32 and the inner periphery of the through hole 24. As shown in FIG. 7, as the stroke amount further increases, the area of the orifice 26 increases proportionately.

In this second embodiment, the characteristics of a conventional electromagnetic switching valve unit can be achieved by causing a large current to flow through the electric coil, while the characteristics of the flow control valve unit can be achieved by causing a small current to flow through the electric coil.

Figure 8:
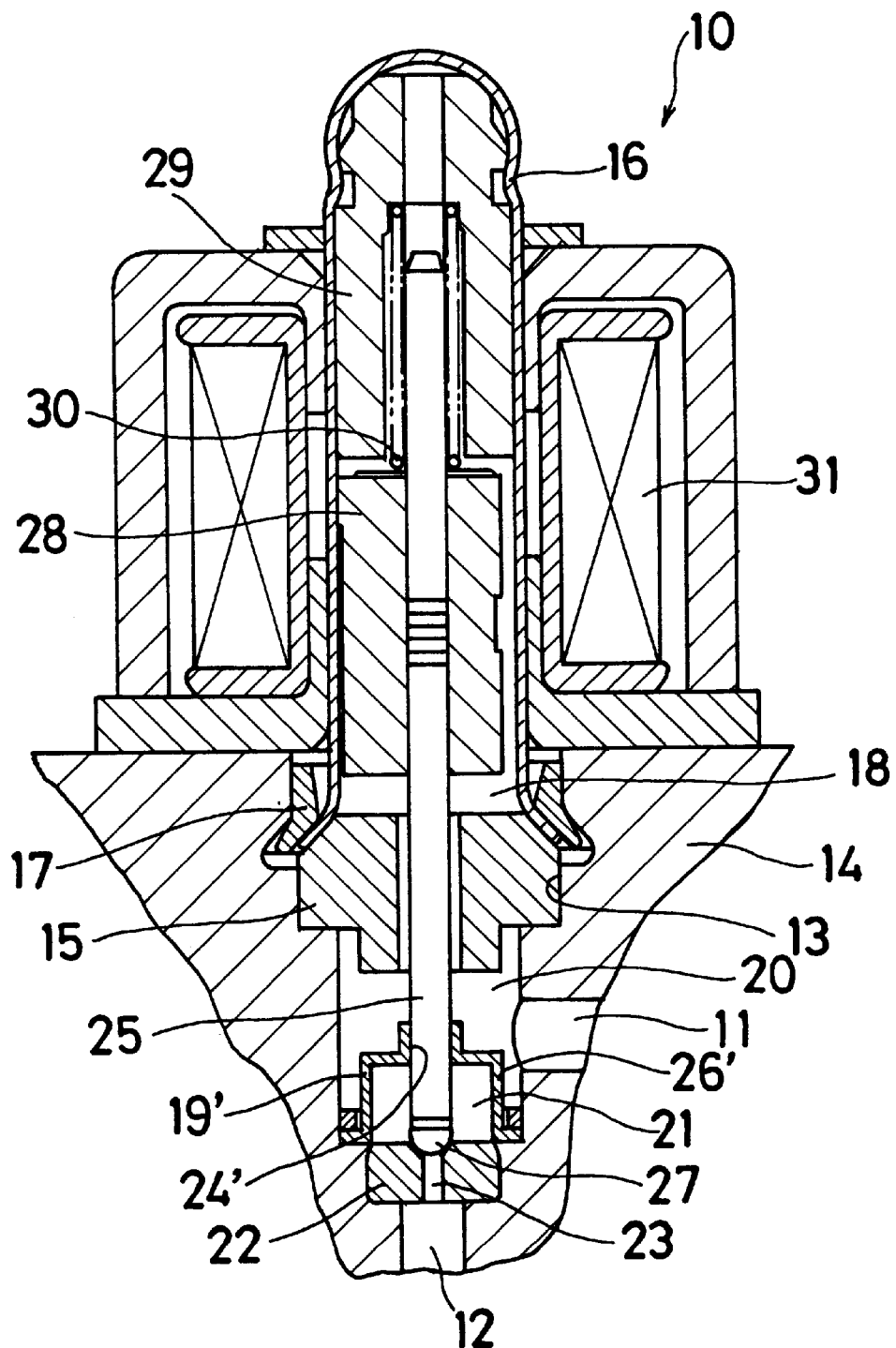
FIG. 8 is a longitudinal cross-sectional view of a flow control valve unit according to another embodiment of the present invention.

While the orifice 26 is formed between the outer periphery of the movable rod 25 and the inner periphery of the through hole 24 in the first and second embodiments shown in FIGS. 1 and 6, the outer periphery of the rod 25 may be engaged in a fluid-tightly with the inner periphery of the through hole 24, with an orifice being formed in the partition member 19 independent of the through hole 24. This alternative construction is shown in FIG. 8 in which the orifice 26' is provided in the partition member 19' at a location different from the hole 24' in the partition member. Further, as can be seen, the partition member 19' in the region of the hole 24' is placed in sealing engagement with the outer periphery of the movable rod 25.

In accordance with the present invention, a flow control valve unit is provided that is compact, inexpensive, and capable of effecting a rather gentle and slow change in the flow of pressure fluid.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A flow control valve unit comprising:
   a pressurized fluid inlet;
   a pressurized fluid outlet;
   a pressurized fluid chamber in which is positioned a stationary seat member;
   a partition member dividing said pressurized fluid chamber into a first section in constant communication with said inlet and a second section that communicates with said outlet via a center opening in the stationary seat member;
   an orifice for communicating said first and second sections to each other;
   a through hole formed in said partition member;
   a movable rod positioned within the pressurized fluid chamber and extending through said through hole in the partition member, said movable rod having a sealing portion at one end for opening and closing said center opening in said stationary seat member during movement of the movable rod;
   a spring operatively associated with said movable rod for urging said movable rod in a direction which causes said sealing portion to close said center opening;
   a magnetic body disposed in said first section and operatively connected to said movable rod; and
   an electric coil to which flows electric current for generating a magnetic force that urges said movable rod via said movable magnetic body in an opening direction to cause the sealing member to move away from and open said center opening, the amount of movement of said movable rod in said opening direction being controlled based on the amount of electric current flowing to the electric coil and a pressure differential between the first section and the second section.

2. The flow control valve unit according to claim 1, further comprising a flywheel diode disposed in parallel with said electric coil and a switching element for starting and stopping energization of said electric coil in a time-dependent manner.

3. The flow control valve unit according to claim 1, wherein said through hole in said partition member is concentric with said center opening of said stationary seat member.

4. The flow control valve unit according to claim 1, wherein said orifice possesses an area formed between an outer periphery of said movable rod and an inner periphery of said through hole, said area remaining constant during movement of said movable rod in response to a change in energization of said electric coil.

5. The flow control valve unit according to claim 1, said orifice is formed in said partition member independent of said through hole.

6. The flow control valve unit according to claim 1, wherein said orifice possesses an area that changes during movement of said movable rod in response to a change in energization of said electric coil.

7. The flow control valve unit according to claim 1, wherein said flow control valve unit is provided in a brake fluid pressure supply passage with the pressurized fluid inlet being connected to a high pressure source and said pressurized fluid outlet being connected to a wheel brake.

8. The flow control valve unit according to claim 1, wherein said flow control valve unit is provided in a brake fluid pressure release passage with the pressurized fluid inlet being connected to a wheel brake and said pressurized fluid outlet being connected to a low pressure source.

9. A flow control valve unit comprising:
a body in which is defined a pressurized fluid chamber;
a pressurized fluid inlet formed in the body;
a pressurized fluid outlet formed in the body;
a seat member in the body, said seat member including a through opening;
a partition member dividing said pressurized fluid chamber into a first section in communication with said pressurized fluid inlet and a second section in communication with said pressurized fluid outlet via the through opening in the seat member;
an orifice provided in said partition member for communicating said first and second sections to each other;
a movable rod positioned within the body, said movable rod having a sealing portion at one end, said movable rod being movable in a closing direction in which the rod moves towards the seat member to cause the sealing portion to engage the seat member and close the through opening and in an opening direction in which the rod moves away from the seat member to cause the sealing portion to move out of engagement with the seat member and open the through opening;
a magnetic body operatively connected to said movable rod; and
an electric coil to which flows electric current for generating a magnetic force that urges said movable rod via said movable magnetic body in the opening direction, the amount of movement of the movable rod in the opening direction being controlled based on the amount of electric current flowing to the electric coil and a pressure differential between the first and second sections.

10. The flow control valve unit according to claim 9, further comprising a flywheel diode disposed in parallel with said electric coil and a switching element for starting and stopping energization of said electric coil in a time-dependent manner.

11. The flow control valve unit according to claim 9, including a through hole formed in said partition member, said movable rod extending through the through hole in the partition member.

12. The flow control valve unit according to claim 11, wherein said orifice is defined between an outer periphery of the movable rod and an inner periphery of the through hole in said partition member.

13. The flow control valve unit according to claim 12, wherein said orifice possesses an area that remains constant during movement of said movable rod in response to a change in energization of said electric coil.

14. The flow control valve unit according to claim 12, wherein said orifice possesses an area that changes during movement of said movable rod in response to a change in energization of said electric coil.

15. The flow control valve unit according to claim 9, including a spring operatively associated with said movable rod for urging said movable rod in the closing direction.

16. The flow control valve unit according to claim 9, wherein the movable rod includes a recessed portion adjacent the sealing portion.

17. The flow control valve unit according to claim 9, wherein the movable rod includes a constant outer diameter adjacent the sealing portion.

18. A flow control valve unit comprising:
a body in which is defined a pressurized fluid chamber;
a pressurized fluid inlet formed in the body;
a pressurized fluid outlet formed in the body;
a seat member in the body, said seat member including a through opening communicating the pressurized fluid chamber with the pressurized fluid outlet;
a movable rod positioned within the body, said movable rod having a sealing portion at one end, said movable rod being movable in a closing direction in which the rod moves towards the seat member to cause the sealing portion to engage the seat member and close the through opening and being movable in an opening direction in which the rod moves away from the seat member to cause the sealing portion to move out of engagement with the seat member and open the through opening;
an orifice located in the pressurized fluid chamber at a position between the seat member and the pressurized fluid inlet for restricting fluid flow in the pressurized fluid chamber flowing from the pressurized fluid inlet towards the through hole in the seat member;
a movable magnetic body operatively connected to said movable rod; and
an electric coil to which flows electric current for generating a magnetic force that urges said movable rod via said movable magnetic body in the opening direction, the amount of movement of said movable rod being controlled based on the amount of electric current flowing to the electric coil and a pressure differential on opposite sides of said orifice.

19. The flow control valve unit according to claim 18, wherein the orifice is provided in a partition member that divides said pressurized fluid chamber into a first section in communication with said pressurized fluid inlet and a second section in communication with said pressurized fluid outlet via the through opening in the seat member.

* * * * *

UNITED STATES PATENT AND TRADEMARK OFFICE
CERTIFICATE OF CORRECTION

PATENT NO.   : 5,984,261
DATED        : November 16, 1999
INVENTOR(S)  : T. AKITA It is certified that error appears in the above-identified patent and that said Letters Patent is hereby corrected as shown below:

On the Title Page:
The following information is added:

[30]    Foreign Application Priority Data

November 20, 1996    [JP]    Japan.......................... 8-309711
        November 26, 1996    [JP]    Japan.......................... 8-314985

Signed and Sealed this

Twenty-seventh Day of March, 2001

Attest:

NICHOLAS P. GODICI

*Attesting Officer*    *Acting Director of the United States Patent and Trademark Office*